United States Patent
Ikeda et al.

(10) Patent No.: US 10,710,201 B2
(45) Date of Patent: Jul. 14, 2020

(54) NI-BASED ALLOY SOLID WIRE FOR WELDING AND NI-BASED ALLOY WELD METAL

(71) Applicant: Kobe Steel, Ltd., Kobe-shi (JP)

(72) Inventors: Tetsunao Ikeda, Fujisawa (JP); Hiroshi Sugahara, Fujisawa (JP); Hiroaki Kawamoto, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 16/076,601

(22) PCT Filed: Feb. 9, 2017

(86) PCT No.: PCT/JP2017/004808
§ 371 (c)(1),
(2) Date: Aug. 8, 2018

(87) PCT Pub. No.: WO2017/145783
PCT Pub. Date: Aug. 31, 2017

(65) Prior Publication Data
US 2019/0039188 A1 Feb. 7, 2019

(30) Foreign Application Priority Data
Feb. 22, 2016 (JP) .................. 2016-031425

(51) Int. Cl.
*C22C 19/05* (2006.01)
*B23K 35/30* (2006.01)
*B23K 35/02* (2006.01)

(52) U.S. Cl.
CPC ........ *B23K 35/304* (2013.01); *B23K 35/0227* (2013.01); *B23K 35/0261* (2013.01);
(Continued)

(58) Field of Classification Search
CPC ... C22C 19/055; C22C 19/053; C22C 19/058; C22F 1/10
See application file for complete search history.

(56) References Cited

U.S. PATENT DOCUMENTS 2,570,193 A * 10/1951 Walter ............... C22C 19/053
420/448
5,897,801 A * 4/1999 Smashey ............ B23K 9/0026
148/524

(Continued)

FOREIGN PATENT DOCUMENTS

| JP | 2002-146497 | * | 5/2002 | .......... C22C 19/055 |
| JP | 2010-172952 | | 8/2010 | |
| JP | 2011-121088 | | 6/2011 | |

OTHER PUBLICATIONS

English Abstract and English Machine Translation of Sato et al. (JP 2002-146497) (May 22, 2002).*

*Primary Examiner* — Jessee R Roe
(74) *Attorney, Agent, or Firm* — Oblon, McClelland, Maier & Neustadt, L.L.P.

(57) ABSTRACT

An Ni-based alloy solid wire for welding has a composition comprising specific amounts of Cr, Ti, Nb, C, S, Mn and Fe, where Mo+W, P, Si, Al, Ca, B, Mg, Zr, Co, O, H, and N are controlled to specific amounts, ([Ti]+[Nb])/[C] is 80 to 150, and the balance is Ni and inevitable impurities. [Ti], [Nb], and [C] represent the contents of Ti, Nb, and C (mass %), respectively.

4 Claims, 1 Drawing Sheet

(52) U.S. Cl.
CPC .............. *B23K 35/30* (2013.01); *C22C 19/05* (2013.01); *C22C 19/053* (2013.01); *C22C 19/055* (2013.01)

(56) References Cited

U.S. PATENT DOCUMENTS

| | | |
|---|---|---|
| 2010/0136368 A1 | 6/2010 | Kiser et al. |
| 2012/0118936 A1 | 5/2012 | Ikeda et al. |
| 2014/0305921 A1 | 10/2014 | Kawasaki et al. |

\* cited by examiner

NI-BASED ALLOY SOLID WIRE FOR WELDING AND NI-BASED ALLOY WELD METAL

TECHNICAL FIELD

The present disclosure relates to a solid wire for welding and a Ni-based alloy weld metal that have a Ni-30Cr-based composition.

BACKGROUND ART

Ni-based alloys have been used as weld metals for a pressure vessel and a steam generator in a light-water reactor for nuclear power generation. Overlay welding with Ni-based alloys have involved using Ni-15Cr-based or Ni-20Cr-based wire. As a measure against primary water stress corrosion cracking (PWSCC) generated in weld metal of Ni-15Cr-based or Ni-20Cr-based wire in pure water, which is primary cooling water, Ni-30Cr-based wire becomes more widely used. A weld metal of Ni-30Cr-based wire, however, tends to cause hot cracking at high temperature during welding compared with that of Ni-15Cr-based or Ni-20Cr-based wire.

The types of hot cracking include solidification cracking in which a liquid phase remaining at the final solidification position before complete solidification of molten weld metal forms openings due to distortion caused by solidification shrinkage and thermal shrinkage; liquation cracking in which impurity element-rich crystal grain boundaries heated to high temperature with welding heat in a subsequent pass in multilayer welding liquefy and form openings; and ductility-dip cracking in which grain boundaries having low cohesive strength in the middle-temperature range not higher than the solidus temperature form openings in response to stress acting on the grain boundaries.

A weld metal of Ni-30Cr-based wire has lower tensile strength than a weld metal of Ni-15Cr-based or Ni-20Cr-based wire. As a result, the weld metal of Ni-30Cr-based wire has lower tensile strength than a base metal, and Ni-30Cr-based wire thus imposes a restriction in device design.

To solve the above-described issues, PTL 1 discloses a Ni-based alloy solid wire for welding having a composition that contains specific amounts of Cr, Ti, Nb, Ta, C, and Fe and in which Al, N, Zr, Mg, P, S, Si, and Mn are controlled to specific amounts or less, with the balance being Ni and inevitable impurities. PTL 1 describes that the Ni-based alloy solid wire for welding provides weld metal with the resistance to ductility-dip reheat cracking, improves the tensile strength of weld metal to larger or equal to that of a base metal, and offers good welding workability.

PTL 2 discloses a high Cr content Ni-based alloy welding material having a composition that contains specific amounts of C, Si, Mn, Cr, Mo, Fe, Cu, Nb+Ta, Al, and Ti and further contains specific amounts of P and S as inevitable impurities, with the balance being Ni. PTL 2 describes that the high Cr content Ni-based alloy welding material can increase tensile strength.

PTL 3 discloses a wire-shaped product formed of a Ni—Cr—Fe alloy containing specific amounts of Cr, Fe, Mn, Nb+Ta, Mo, Si, Ti, Al, Cu, Zr, S, B, C, P, and Mg+Ca, with the balance being Ni and inevitable impurities. PTL 3 describes that the wire-shaped product can provide desired strength and desired resistance in addition to the resistance to solidification cracking, ductility-dip cracking, root cracking, and stress corrosion cracking.

PTL 4 discloses a Ni-based high Cr alloy weld wire having a composition that contains specific amounts of C, Mn, Fe, Si, Al, Ti, Cr, Ta, and Mo and further contains specific amounts of Ca+Mg, N, P, O, S, H, Cu, and Co as inevitable impurities, with the balance being Ni. PTL 4 describes that the Ni-based high Cr alloy weld wire can improve the tensile strength of weld zones, the resistance to weld cracking, the quality of the microstructure of weld metal, and the welding workability.

CITATION LIST

Patent Literature

PTL 1: Japanese Patent No. 5441870
PTL 2: Japanese Unexamined Patent Application Publication No. 2010-172952
PTL 3: Japanese Patent No. 5420406
PTL 4: Japanese Patent No. 5270043

SUMMARY OF INVENTION

Technical Problem

However, wires known in the art have the following issues: the effect of avoiding hot cracking is insufficient; and upon post weld heat treatment (PWHT) for tempering carbon steel after overlay welding on carbon steel, intermetallic compounds, such as a phase, precipitate in a region where alloy components, such as Mo, are concentrated due to solidification segregation, and such precipitation of alloy components thus makes weld metal brittle. There is also the following issue: diffusion of carbon from a base metal toward weld metal in PWHT generates a carburized layer and a decarburized layer with a bond interposed therebetween and makes the bond brittle. The term "bond" refers to an interface between a weld metal and a base metal.

In light of the above-described issues, the present disclosure is directed to a Ni-based alloy solid wire for welding and a Ni-based alloy weld metal that are less susceptible to hot cracking, have high tensile strength, and are unlikely to become brittle even upon PWHT.

Solution to Problem

A Ni-based alloy solid wire for welding according to a first aspect of the present invention has a composition that contains Cr: 27.0 to 31.5 mass %, Ti: 0.80 to 2.40 mass %, Nb: 0.30 to 2.40 mass %, C: 0.020 to 0.040 mass %, S: 0.0005 to 0.0030 mass %, Mn: 0.20 to 1.00 mass %, and Fe: 5.0 to 11.0 mass %, and further contains Mo+W: 0.5 mass % or less, P: 0.0100 mass % or less, Si: 0.50 mass % or less, Al: 0.20 mass % or less, Ca: 0.005 mass % or less, B: 0.005 mass % or less, Mg: 0.010 mass % or less, Zr: 0.005 mass % or less, Co: 0.10 mass % or less, O: 0.015 mass % or less, H: 0.003 mass % or less, and N: 0.015 mass % or less, with the balance being Ni and inevitable impurities, wherein ([Ti]+[Nb])/[C] is 80 to 150, where [Ti], [Nb], and [C] represent the amounts (mass %) of Ti, Nb, and C, respectively.

When the Ni-based alloy solid wire for welding according to the first aspect of the present invention thus has a composition that contains specific amounts of Cr, Ti, Nb, C, S, Mn, and Fe and in which Mo+W, P, Si, Al, Ca, B, Mg, Zr, Co, O, H, and N are controlled to specific amounts or less, wherein ([Ti]+[Nb])/[C] is a specific amount (80 to 150), carbides, and carbonitrides, and/or intermetallic compounds of Ti, Nb, Mo, and W precipitate to improve the tensile strength of weld metal. When the Ni-based alloy solid wire for welding according to the first aspect of the present invention has the above-described composition, precipitation of Ti and Nb carbides suppresses precipitation of coarse Cr carbide at grain boundaries, thereby avoiding, for example, intergranular corrosion and stress corrosion cracking and suppressing an increase in susceptibility to hot cracking during welding. When the Ni-based alloy solid wire for welding according to the first aspect of the present invention has the above-described composition, diffusion of C from the base metal to the weld metal is unlikely to occur even after PWHT, suppressing formation of a carburized layer and a decarburized layer, which have low ductility and low toughness, and thus suppressing embrittlement of the bond. When the Ni-based alloy solid wire for welding according to the first aspect of the present invention has the above-described composition, formation of slags as a result of adhesion of metal oxides to the weld bead surface is suppressed to improve welding workability.

A Ni-based alloy weld metal according to a second aspect of the present invention is produced by using the Ni-based alloy solid wire for welding.

When the Ni-based alloy solid wire for welding is used for the Ni-based alloy weld metal according to the second aspect of the present invention, carbides, and carbonitrides, and/or intermetallic compounds of Ti, Nb, Mo, and W precipitate to improve the tensile strength of weld metal. When the Ni-based alloy solid wire for welding is used for the Ni-based alloy weld metal according to the second aspect of the present invention, precipitation of Ti and Nb carbides suppresses precipitation of coarse Cr carbide at grain boundaries, thereby avoiding, for example, intergranular corrosion and suppressing an increase in susceptibility to hot cracking during welding. When the Ni-based alloy solid wire for welding is used for the Ni-based alloy weld metal according to the second aspect of the present invention, diffusion of C from the base metal to the weld metal is unlikely to occur even after PWHT, suppressing formation of a carburized layer and a decarburized layer, which have low ductility and low toughness, and thus suppressing embrittlement of the weld metal. When the Ni-based alloy solid wire for welding is used for the Ni-based alloy weld metal according to the embodiment of the present invention, formation of slags as a result of adhesion of metal oxides to the weld bead surface is suppressed to improve welding workability.

Advantageous Effects of Invention

According to the aspects of the present invention, there are provided the Ni-based alloy solid wire for welding and the Ni-based alloy weld metal that are less susceptible to hot cracking, have high tensile strength, and does not become brittle even upon PWHT. According to the aspects of the present invention, the Ni-based alloy solid wire for welding and the Ni-based alloy weld metal offer high corrosion resistance and high welding workability.

Figure 1:
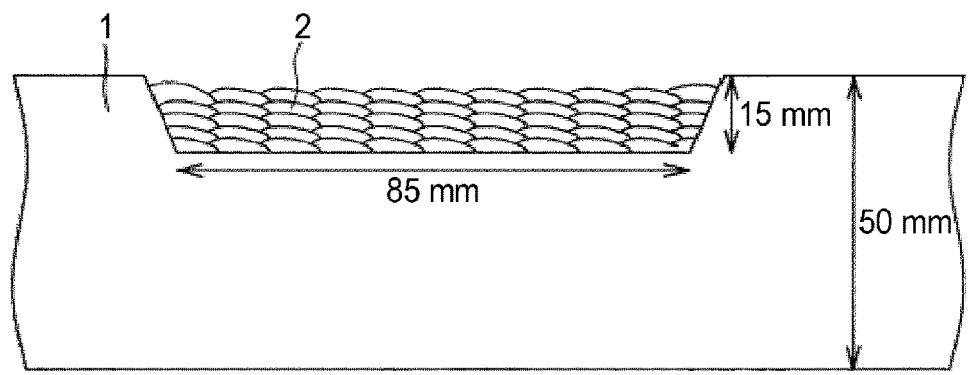
FIG. 1 is a schematic diagram illustrating multilayer overlay welding.

DESCRIPTION OF EMBODIMENTS (First Aspect: Ni-Based Alloy Solid Wire for Wiring)

A Ni-based alloy solid wire for welding according to an embodiment of the present invention will be described.

The Ni-based alloy solid wire for welding (hereinafter referred to as a wire) has a composition that contains Cr: 27.0 to 31.5 mass %, Ti: 0.80 to 2.40 mass %, Nb: 0.30 to 2.40 mass %, C: 0.020 to 0.040 mass %, S: 0.0005 to 0.0030 mass %, Mn: 0.20 to 1.00 mass %, and Fe: 5.0 to 11.0 mass %, and further contains Mo+W: 0.5 mass % or less, P: 0.0100 mass % or less, Si: 0.50 mass % or less, Al: 0.20 mass % or less, Ca: 0.005 mass % or less, B: 0.005 mass % or less, Mg: 0.010 mass % or less, Zr: 0.005 mass % or less, Co: 0.10 mass % or less, O: 0.015 mass % or less, H: 0.003 mass % or less, and N: 0.015 mass % or less, with the balance being Ni and inevitable impurities, wherein ([Ti]+[Nb])/[C] is 80 to 150, where [Ti], [Nb], and [C] represent the amounts (mass %) of Ti, Nb, and C, respectively.

Effective ways to increase the tensile strength of weld metal formed by using the wire include solid solution strengthening of a matrix and strengthening with fine crystallized matter or precipitates. The presence of Nb, Ti, Mo, and other elements causes precipitation of carbides and carbonitrides and/or intermetallic compounds to increase tensile strength. However, a wire containing these strengthening elements is more susceptible to hot cracking during welding, and thus there are optimum ranges for the amounts of strengthening elements.

When a weld metal that is the same type of steel as the base metal is overlay-welded on carbon steel, which serves as the base metal, PWHT is typically performed at about 600° C. for the purpose of tempering the heat-affected zone on the base metal side. It is thus necessary to ensure the quality and mechanical performance of the weld zone after PWHT. In PWHT, more carbon diffuses toward the weld metal from the base metal during PWHT as a difference between the concentration of C in the weld metal and the concentration of C in the base metal increases. As a result, a carburized layer with a high concentration of C is formed on the weld metal side from the bond, and a decarburized layer with a low high concentration of C is formed on the base metal side. The carburized layer and the decarburized layer become thicker as the temperature of PWHT is higher and the retention time is longer. Since the carburized layer and the decarburized layer have low ductility and/or low toughness, there is a risk that application of stress may cause breakage from these layers. The diffusion of C during the PWHT process is also affected by the alloy components in the weld metal, and the presence of Mo and W, which have a great ability to form a carbide, in the weld metal promotes the diffusion of C, as revealed by diligent studies. Moreover, excess C that does not combine with Nb or Ti precipitates at grain boundaries as Cr carbide to degrade corrosion resistance. Excess Nb and Ti that do not combine with C precipitate as an intermetallic compound to promote embrittlement of the weld metal.

The inventors of the present invention found that the formation of brittle layers adjacent to the bond is avoided by controlling the amount of Mo and W in the wire but adding C to the wire and accordingly suppressing the diffusion of C from the base metal to the weld metal. The precipitation of Cr carbide and intermetallic compounds is suppressed by controlling ([Ti]+[Nb])/[C] to a specific amount (80 to 150), which avoids degradation in corrosion resistance and embrittlement of the weld metal.

The reasons for numerical limitation on the composition of the wire will be described below.

(Cr: 27.0 to 31.5 Mass %)

Chromium (Cr) is a component indispensable to corrosion resistance since Cr forms a $Cr_2O_3$ coating on the surface of the weld metal and becomes passivated. Therefore, the Cr content is 27.0 mass % or more, and preferably 29.0 mass % or more. The presence of excess Cr makes it easy to form coarse Cr carbide at grain boundaries and increases susceptibility to ductility-dip cracking. Therefore, the Cr content is 31.5 mass % or less, and preferably 31.0 mass % or less.

(Ti: 0.80 to 2.40 Mass %)

Titanium (Ti) is not only dissolved in a Ni matrix but also precipitated as carbonitride and $\gamma'$ phase ($Ni_3Ti$) to improve the tensile strength of the weld metal. In particular, the $\gamma'$ phase forms a fine coherent precipitate in the matrix to impede dislocation motion; therefore, Ti is a component highly effective in improving tensile strength. Titanium (Ti) combines with C to suppress precipitation of Cr carbide at grain boundaries; therefore, Ti is effective in avoiding intergranular corrosion and stress corrosion cracking. Moreover, Ti combines with Ni to form precipitates in grains and at grain boundaries to improve tensile strength. Therefore, the Ti content is 0.80 mass % or more, and preferably 0.90 mass % or more. The presence of excess Ti causes precipitation of a large amount of $\gamma'$ phase and promotes embrittlement of the weld metal during PWHT. Excess Ti oxidizes and surfaces as scale in a molten pool, and the scale adheres to the weld bead surface to form slag. The molten pool is shielded from the atmosphere by application of an inert gas during welding, but the presence of excess Ti hinders complete suppression of slag formation. Therefore, the Ti content is 2.40 mass % or less, and preferably 1.80 mass % or less.

(Nb: 0.30 to 2.40 Mass %)

Niobium (Nb) is not only dissolved in the matrix but also forms a coherent precipitate in the matrix as MC carbonitride and $\gamma''$ phase ($Ni_3Nb$) to improve the tensile strength of the weld metal. Since the $\gamma''$ phase precipitates slower than the $\gamma'$ phase, the $\gamma''$ phase undergoes a small degree of embrittlement caused by PWHT. Fine Nb carbide precipitated at grain boundaries suppresses precipitation of Cr carbides, such as coarse $Cr_{23}C_6$ and $Cr_7C_3$, at grain boundaries and forms tortuous grain boundaries through pinning of migrating grain boundaries to suppress grain boundary sliding, which is effective in avoiding ductility-dip cracking. Niobium (Nb) combines with C rather than Cr and thus suppresses intergranular corrosion caused by precipitation of Cr carbides at grain boundaries. Therefore, the Nb content is 0.30 mass % or more, and preferably 0.40 mass % or more.

However, excess Nb tends to be concentrated in dendrite boundaries due to solidification segregation during solidification of the weld metal to crystallize or precipitate low-melting-point compounds. The presence of excess Nb results in generation of solidification cracking and/or reheat liquation cracking. Excess Nb leads to noticeable precipitation of the $\gamma''$ phase in addition to carbides and fails to exert the effect of improving corrosion resistance. Therefore, the Nb content is 2.40 mass % or less, and preferably 2.20 mass % or less. The same effect is obtained even when Nb is partially or entirely substituted by Ta, which has properties similar to those of Nb.

(C: 0.020 to 0.040 Mass %)

Carbon (C) combines with Ti and Nb in the solidification process to form precipitates at grain boundaries as carbides, such as MC, $M_6C$, and $M_{23}C_6$, suppressing grain boundary sliding to avoid ductility-dip cracking and causing precipitation strengthening to improve tensile strength. When the C content in overlay weld metal on carbon steel (base metal) is low, carbon (C) diffuses from the base metal to the weld metal during PWHT, and the carburized and decarburized layers become thick. This causes, for example, many fine opening defects adjacent to the bond in the side bend test. The presence of 0.020 mass % or more of C, preferably 0.025 mass % or more of C, in the wire suppresses the diffusion of C and prevents generation of defects in the side bend test. For excess C, an excess of free C not bonded to Ti or Nb combines with Cr, and Cr carbides such as $Cr_{23}C_6$ and $Cr_7C_3$ precipitate at grain boundaries, forming carbide depletion layers adjacent to grain boundaries and causing intergranular corrosion and/or stress corrosion cracking. Therefore, the C content is 0.040 mass % or less, and preferably 0.035 mass % or less.

(S: 0.0005 to 0.0030 Mass %)

Sulfur (S) is segregated and concentrated at grain boundaries during solidification of weld metal to produce a low-melting-point compound, and thus causes solidification cracking, reheat liquation cracking, and/or ductility-dip cracking. Therefore, the S content is 0.0030 mass % or less, and preferably 0.0018 mass % or less. However, an excessively low S content results in low wettability of molten metal and poor dispersion, which causes a deterioration in weld bead shape. Therefore, the S content is 0.0005 mass % or more, and preferably 0.0006 mass % or more.

(Mn: 0.20 to 1.00 Mass %)

Manganese (Mn) is used as a deoxidizer in the melting process and has an effect of improving hot workability by being bonded to troublesome S. Therefore, the Mn content is 0.20% or more, and preferably 0.47 mass % or more. In general, the Mn raw material itself has a high concentration of S. The concentration of S increases with increasing Mn content, causing hot cracking. Therefore, the Mn content is 1.00 mass % or less, and preferably 0.60 mass % or less.

(Fe: 5.0 to 11.0 Mass %)

Iron (Fe) is dissolved in the Ni-based alloy to improve hot workability during wire production. Therefore, the Fe content is 5.0 mass % or more, and preferably 8.2 mass % or more. However, excess Fe increases the susceptibility to hot cracking during welding. Therefore, the Fe content is 11.0 mass % or less, and preferably 9.0 mass % or less.

(Mo+W: 0.5 Mass % or Less)

Molybdenum (Mo) and tungsten (W) improve the tensile strength of weld metal by way of solid solution strengthening of the matrix and precipitation of $M_6C$. The presence of small amounts of Mo and W provides a weak effect. The presence of large amounts of Mo and W causes solidification segregation of Mo and W in weld metal and thus concentration of Mo and W at grain boundaries and/or dendrite interfaces. For this, the PWHT causes generation of intermetallic compounds, such as $\sigma$ phase, and impairs the ductility and toughness of weld metal. When the overlay weld metal on the base metal, which is carbon steel, contains Mo and W, carbon (C) diffuses from the base metal toward the weld metal during the PWHT process and promotes the formation of carburized and decarburized layers, causing embrittlement adjacent to the bond and generating opening defects in the side bend test. Therefore, the total amount of Mo and W (Mo+W) is 0.5 mass % or less, and preferably 0.3 mass % or less. The lower limit of Mo+W is preferably 0.1 mass %.

(P: 0.0100 Mass % or Less)

Phosphorus (P) is segregated and concentrated at grain boundaries during solidification of weld metal to produce a low-melting-point compound, and thus causes solidification cracking, reheat liquation cracking, and/or ductility-dip cracking. Therefore, the P content is 0.0100 mass % or less, and preferably 0.0080 mass % or less.
(Si: 0.50 Mass % or Less)
Silicon (Si) has an effect of improving fluidity of molten metal but promotes solidification cracking and production of intermetallic compounds to cause embrittlement. Therefore, Si is not intentionally added, but the Si content is 0.50 mass % or less, and preferably 0.22 mass % or less since a commonly available raw material contains unavoidable Si.
(Al: 0.20 Mass % or Less)
Aluminum (Al) is used as a deoxidizer during melting. Aluminum (Al) contributes to strengthening by forming a coherent precipitate in the matrix as the γ' phase in the weld metal and thus improves tensile strength. In particular, this effect by PWHT is noticeable. However, when Al is present, the thermal stress generated by performing PWHT on a welded joint with a high intensity of restraint causes fine cracks and significantly reduces toughness. Aluminum (Al) adheres to the weld bead surface as an oxide to generate slag inclusions. Therefore, the Al content is 0.20 mass % or less, and preferably 0.10 mass % or less. The lower limit of the Al content is preferably 0.02 mass %.
(Ca: 0.005 Mass % or Less)
Calcium (Ca) adheres to the weld bead surface as an oxide to generate slag inclusions. Calcium (Ca) makes the arc instable during MIG welding and causes weld defects. Therefore, the Ca content includes Ca remaining on the wire surface as a wire drawing lubricant during wire production. Therefore, the Ca content is 0.005 mass % or less, and preferably 0.002 mass % or less.
(B: 0.005 Mass % or Less, Mg: 0.010 Mass % or Less, and Zr: 0.005 Mass % or Less)
Boron (B), magnesium (Mg), and zirconium (Zr) have an effect of strengthening grain boundaries by being segregated at grain boundaries and improving hot workability during wire production. The presence of excess B, Mg, and Zr causes formation of low-melting-point compounds at grain boundaries and increases susceptibility to hot cracking during welding. Magnesium (Mg) and zirconium (Zr) tend to oxidize and adhere to the weld bead surface as slags to generate slag inclusions. Therefore, the B content, the Mg content, and the Zr content are 0.005 mass % or less, 0.010 mass % or less, and 0.005 mass % or less, respectively, and preferably 0.001 mass % or less, 0.007 mass % or less, and 0.003 mass % or less, respectively. The lower limit of the Mg content is preferably 0.002 mass %.
(Co: 0.10 Mass % or Less)
Cobalt (Co) contributes to strengthening by being completely dissolved in Ni, but Co changes into isotope $^{60}$Co with a long half-life upon irradiation with neutrons in a furnace. Thus, Co is not intentionally added. Therefore, the Co content is 0.10 mass % or less, and preferably 0.01 mass % or less.
(O: 0.015 Mass % or Less)
Oxygen (O) is contained as a fine oxide base inclusion in the wire. The oxide base inclusion directly transfers to the weld metal and is dispersed as it is. When the weld metal is finished with machining, the inclusion appears as a defect on the processed surface. Therefore, the O content is 0.015 mass % or less, and preferably 0.007 mass % or less.
(H: 0.003 Mass % or Less)
Hydrogen (H) in the wire directly transfers to the weld metal and is segregated mainly at grain boundaries. The segregated H at grain boundaries weakens the cohesive strength of the grain boundaries upon tensile deformation of the weld metal, reducing deformation elongation. Therefore, the H content is 0.003 mass % or less, and preferably 0.001 mass % or less.
(N: 0.015 Mass % or Less)
Nitrogen (N) generates blowholes in the weld metal. Therefore, the N content is 0.015 mass % or less, and preferably 0.006 mass % or less.
(([Ti]+[Nb])/[C]: 80 to 150)
As described above, the wire according to the embodiment of the present invention contains 0.020 to 0.040 mass % of C. Free C not bonded to elements such as Ti and Nb in the solidification process combines with Cr to form precipitates at grain boundaries in PWHT after overlay welding and to reduce corrosion resistance adjacent to grain boundaries, causing intergranular corrosion and/or stress corrosion cracking. Thus, only specifying the absolute values of the Ti content and the Nb content in the wire is insufficient. For example, when the C content relative to the total amount of Ti and Nb is too large, excess C causes Cr carbide precipitation and degrades corrosion resistance. Therefore, ([Ti]+[Nb])/[C], which is the ratio of the total amount of Ti and Nb to the C content, is 80 or more and preferably 88 or more. When the C content is too small, free Ti and free Nb form an intermetallic compound during PWHT to increase the degree of embrittlement of the weld metal. Therefore, ([Ti]+[Nb])/[C] is 150 or less, and preferably 110 or less.
In this specification, [Ti], [Nb], and [C] represent the amounts (mass %) of Ti, Nb, and C, respectively.
(Balance)
The balance is Ni and inevitable impurities. The inevitable impurities are V, Cu, and other elements. Unless the advantageous effects of the embodiment of the present invention are impaired, the wire contains V: 0.10 mass % or less and Cu: 0.15 mass % or less, with the total amount being 0.2 mass % or less. Unless the amounts of V, Cu, and other elements exceed the above-described specific amounts, the advantageous effects of the embodiment of the present invention are not impaired both in the case where V, Cu, and other elements are contained as inevitable impurities and in the case where V, Cu, and other elements are added intentionally.
The elements that are controlled by specifying only the upper limits as described above, such as (Mo+W), P, Si, Al, Ca, B, Mg, Zr, Co, O, H, and N, may be contained as inevitable impurities.
(Second Aspect: Ni-Based Alloy Weld Metal)
Next, a Ni-based alloy weld metal according to an embodiment of the present invention is produced by welding base metals made of steel, such as carbon steel or stainless steel, using the wire according to the first aspect of the present invention.

EXAMPLES

Figure 2:
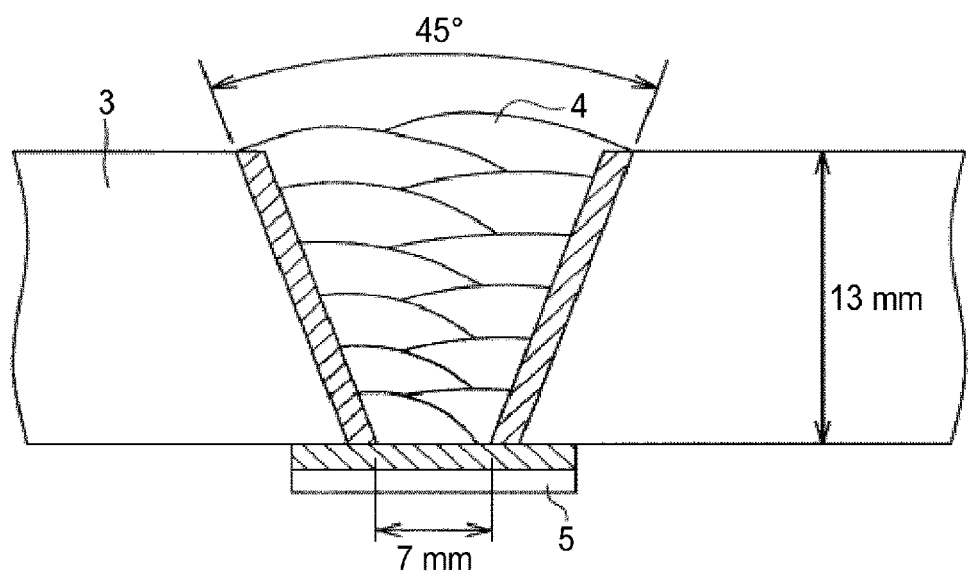
FIG. 2 is a schematic diagram indicating an all-weld metal test piece.

Next, Examples of the present invention will be described.
A Ni-alloy ingot was produced through a melting process in a vacuum melting furnace. The Ni-alloy ingot was then subjected to forging and rolling and then to wire drawing, whereby a wire having a diameter of 1.2 mm and the composition shown in Table 1 was produced.
Using the produced wire, the multilayer overlay welding test was performed by way of TIG welding. In the multilayer overlay welding test, as illustrated in FIG. 1, an ASTM A533B steel sheet 50 mm thick was used as a base metal 1, and a weld metal 2 was formed in a recess (depth: 15 mm, width of bottom: 85 mm) of the base metal 1 using five-layer overlay welding. The thickness of the weld metal 2 was 15 mm, and the width of the bottom of the weld metal 2 was 85 mm. The all-weld metal test piece illustrated in FIG. 2 was produced by also using TIG welding. In the all-weld metal test piece, a weld metal 4 without the influence of dilution of the base metal was formed by performing buttering welding on the groove face composed of a backing material 5 and two SM490A steel sheets 13 mm thick serving as base metals 3. In FIG. 2, the hatched portions indicate the portions that have undergone buttering welding.

The welding conditions were a welding current of 200 A, an arc voltage of 11 V, a welding speed of 60 mm/min, a wire feeding speed of 9 g/min, a shielding gas of 100% Ar, and a shielding gas flow rate of 15 L/min.

The cracking resistance and corrosion resistance of the weld metal 2 in FIG. 1 were evaluated, and the room-temperature tensile strength (TS (AW)) and the tensile ductility after PWHT were evaluated for the weld metal 4 in FIG. 2. The evaluation results are shown in Table 2.

The evaluation method is as described below.
(Cracking Resistance and Embrittlement of Bond)

Five bend test pieces having a thickness of 10 mm in the direction perpendicular to the surface of the weld metal 2 were cut out. The bend test pieces were bent under a condition of a bend radius of about 50 mm in conformity with JIS Z 2248:2014. The cross section after bending was subjected to penetrant testing and evaluated for the number of cracks. The cracking resistance was evaluated as follows: the number of cracks in five cross sections of the bend test pieces were counted; and the cracking resistance was rated A (good) when the average number of cracks per cross section was less than 5 and there was no defect at the bond, and rated B (poor) when the average number of cracks per cross section was 5 or more and there were defects at the bond.
(Room-Temperature Tensile Strength: TS (AW))

One tensile test piece (test piece Al) in conformity with JIS Z 3111:2015 was cut out from the weld metal 4. The tensile test piece was subjected to tensile strength testing in conformity with JIS Z 3111:2015. The room-temperature tensile strength was rated A (good) when the average tensile strength was 650 MPa or more, and rated R (poor) when the average tensile strength was less than 650 MPa. Note that TS is an acronym for tensile strength and AW is an acronym for as weld.
(Tensile Ductility after PWHT)

The weld metal 4 was subjected to a heat treatment at 600° C. corresponding to PWHT. One tensile test piece (test piece A1) in conformity with JIS Z 3111:2015 was cut out from the weld metal 4 after the heat treatment. The tensile test piece was subjected to tensile testing in conformity with JIS Z 3111:2015. The tensile ductility was rated A (good ductility, less embrittlement) when the average elongation was 35% or more, and rated B (poor ductility, more embrittlement) when the average elongation was less than 35%.
(Corrosion Resistance)

A test piece was cut out from the weld metal 2 formed by overlay welding and subjected to corrosion testing in conformity with JIS C 0572:2006. The corrosion resistance was rated A (good) when the corrosion weight loss was 1.5 g/m$^2$-hr or less, and rated B (poor) when the corrosion weight loss was over 1.5 g/m$^2$-hr.
(Overall Rating)

In overall rating, the case where the cracking resistance, the TS (AW), the tensile ductility after PWHT, and the corrosion resistance were all rated A (good) was rated ○ (acceptable), and the case where at least one of these items was rated B (poor) was rated x (not acceptable).

The welding workability of multilayer overlay welding was evaluated by using the following evaluation method. The results are shown in Table 2.
(Welding Workability)

The amount of slag that adheres to the weld bead surface during overlay welding was visually observed. The welding workability was rated A (excellent) when the amount of slag was very small, B (good) when the amount of slag was small, and C (poor) when the amount of slag was large.

TABLE 1

| No. | Example/ Comparative Example | Composition of Wire (mass %, balance: Ni and inevitable impurities) | | | | | | | | | | | |
|---|---|---|---|---|---|---|---|---|---|---|---|---|
| | | Cr | C | Ti | Nb | Si | Mn | P | S | Mo + W | Al | Fe | Mg |
| A1 | Example | 29.9 | 0.033 | 1.10 | 2.10 | 0.22 | 0.54 | 0.0060 | 0.0006 | 0.2 | 0.08 | 9.0 | 0.007 |
| A2 | Example | 29.9 | 0.034 | 2.00 | 1.00 | 0.22 | 0.52 | 0.0040 | 0.0007 | 0.2 | 0.10 | 8.8 | 0.004 |
| A3 | Example | 30.2 | 0.030 | 1.10 | 2.20 | 0.21 | 0.49 | 0.0080 | 0.0018 | 0.3 | 0.05 | 8.2 | 0.002 |
| A4 | Example | 29.6 | 0.031 | 0.97 | 2.05 | 0.20 | 0.47 | 0.0020 | 0.0010 | 0.1 | 0.03 | 8.5 | 0.004 |
| A5 | Example | 29.9 | 0.028 | 1.91 | 0.98 | 0.20 | 0.48 | 0.0020 | 0.0010 | 0.1 | 0.02 | 8.6 | 0.004 |
| A6 | Example | 29.3 | 0.026 | 1.43 | 0.98 | 0.20 | 0.48 | 0.0020 | 0.0010 | 0.1 | 0.02 | 8.5 | 0.005 |
| A7 | Example | 29.8 | 0.027 | 1.93 | 0.49 | 0.20 | 0.48 | 0.0020 | 0.0010 | 0.1 | 0.02 | 8.5 | 0.004 |
| B1 | Comparative Example | 30.0 | 0.033 | 1.10 | 3.40 | 0.21 | 0.50 | 0.0090 | 0.0013 | 0.1 | 0.04 | 8.5 | 0.005 |
| B2 | Comparative Example | 29.8 | 0.035 | 1.10 | 3.80 | 0.21 | 0.53 | 0.0120 | 0.0011 | 0.2 | 0.06 | 8.7 | 0.003 |
| B3 | Comparative Example | 29.8 | 0.030 | 0.20 | 2.40 | 0.21 | 0.22 | 0.0080 | 0.0007 | 0.2 | 0.08 | 8.3 | 0.004 |
| B4 | Comparative Example | 31.2 | 0.016 | 0.72 | 0.54 | 0.14 | 0.37 | 0.0014 | 0.0004 | 0.1 | 0.02 | 9.2 | 0.004 |
| B5 | Comparative Example | 28.5 | 0.026 | 0.83 | 0.65 | 0.24 | 0.55 | 0.0014 | 0.0008 | 0.3 | 0.02 | 8.5 | 0.003 |
| B6 | Comparative Example | 30.4 | 0.021 | 0.33 | 0.58 | 0.21 | 0.44 | 0.0028 | 0.0009 | 0.2 | 0.05 | 8.5 | 0.004 |
| B7 | Comparative Example | 28.1 | 0.036 | 0.67 | 0.54 | 0.26 | 0.37 | 0.0022 | 0.0009 | 0.1 | 0.03 | 8.6 | 0.003 |
| B8 | Comparative Example | 29.4 | 0.022 | 1.89 | 1.74 | 0.22 | 0.55 | 0.0020 | 0.0010 | 0.2 | 0.04 | 8.7 | 0.003 |

TABLE 1-continued

| | | | | | | | | | | | | |
|---|---|---|---|---|---|---|---|---|---|---|---|---|
| B9 | Comparative Example | 30.1 | 0.023 | 0.90 | 0.68 | 0.28 | 0.62 | 0.0018 | 0.0012 | 0.1 | 0.02 | 9.5 0.004 |
| B10 | Comparative Example | 28.9 | 0.032 | 1.22 | 1.45 | 0.31 | 0.47 | 0.0025 | 0.0014 | <u>0.8</u> | 0.02 | 9.1 0.002 |

| | Composition of Wire (mass %, balance: Ni and inevitable impurities) | | | | | | | |
|---|---|---|---|---|---|---|---|---|
| No. | Zr | Ca | Co | N | B | O | H | (Ti +Nb)/C |
| A1 | <0.005 | 0.002 | 0.01 | 0.003 | <0.001 | 0.005 | <0.001 | 97 |
| A2 | <0.005 | 0.002 | 0.01 | 0.004 | <0.001 | 0.006 | 0.001 | 88 |
| A3 | <0.005 | 0.001 | 0.01 | 0.006 | <0.001 | 0.006 | 0.001 | 110 |
| A4 | <0.005 | <0.001 | 0.01 | 0.002 | <0.001 | 0.004 | <0.001 | 97 |
| A5 | <0.005 | 0.001 | 0.01 | 0.001 | <0.001 | 0.005 | 0.001 | 103 |
| A6 | <0.005 | 0.001 | 0.01 | 0.001 | <0.001 | 0.004 | <0.001 | 93 |
| A7 | <0.005 | 0.002 | 0.01 | 0.001 | <0.001 | 0.007 | 0.001 | 90 |
| B1 | <0.005 | <0.001 | 0.04 | 0.012 | <0.001 | 0.002 | 0.001 | 136 |
| B2 | <0.005 | <0.001 | 0.05 | 0.005 | <0.001 | 0.006 | <0.001 | 140 |
| B3 | <0.005 | 0.001 | 0.04 | 0.013 | <0.001 | 0.004 | <0.001 | 87 |
| B4 | <0.005 | <0.001 | 0.03 | 0.007 | <0.001 | 0.004 | 0.001 | <u>79</u> |
| B5 | <0.005 | 0.001 | 0.03 | 0.009 | <0.001 | 0.006 | 0.001 | <u>57</u> |
| B6 | <0.005 | 0.001 | 0.04 | 0.007 | <0.001 | 0.003 | 0.002 | <u>43</u> |
| B7 | <0.005 | 0.001 | 0.04 | 0.013 | <0.001 | 0.006 | <0.001 | <u>34</u> |
| B8 | <0.005 | 0.001 | 0.04 | 0.006 | <0.001 | 0.005 | 0.001 | <u>165</u> |
| B9 | <0.005 | 0.001 | 0.03 | 0.007 | <0.001 | 0.004 | 0.002 | <u>69</u> |
| B10 | <0.005 | 0.001 | 0.04 | 0.009 | <0.001 | 0.006 | <0.001 | 83 |

Note:
the underlines indicate that the composition does not satisfy the claims.

TABLE 2

| No. | Example/ Comparative Example | Cracking Resistance | TS (AW) | Tensile Ductility after PWHT | Corrosion Resistance | Overall Rating | Welding Workability (amount of slag) |
|---|---|---|---|---|---|---|---|
| A1 | Example | A | A | A | A | ○ | A |
| A2 | Example | A | A | A | A | ○ | B |
| A3 | Example | A | A | A | A | ○ | A |
| A4 | Example | A | A | A | A | ○ | A |
| A5 | Example | A | A | A | A | ○ | B |
| A6 | Example | A | A | A | A | ○ | A |
| A7 | Example | A | A | A | A | ○ | B |
| B1 | Comparative Example | B | A | B | B | X | A |
| B2 | Comparative Example | B | A | B | B | X | A |
| B3 | Comparative Example | B | B | B | B | X | A |
| B4 | Comparative Example | B | B | B | B | X | A |
| B5 | Comparative Example | A | A | A | B | X | A |
| B6 | Comparative Example | B | B | A | B | X | A |
| B7 | Comparative Example | A | B | A | B | X | A |
| B8 | Comparative Example | B | A | B | A | X | B |
| B9 | Comparative Example | A | A | A | B | X | A |
| B10 | Comparative Example | B | A | B | A | X | A |

As shown in Table 1 and Table 2, Examples (A1 to A7) were rated ○ (acceptable) because Examples (A1 to A7) satisfy the composition specified in the claims and thus the cracking resistance, TS (AW), tensile ductility after PWHT, and corrosion resistance of Examples (A1 to A7) were all rated A (good). The welding workability of Examples (A1 to A7) was also rated A (excellent) or B (good).

Comparative Example (B1) was rated x (not acceptable) because the Nb content was over the upper limit and thus the cracking resistance, the tensile ductility after PWHT, and the corrosion resistance were rated B (poor). Comparative Example (B2) was rated x (not acceptable) because the Nb content and the P content were over the upper limits and thus the cracking resistance, the tensile ductility after PWHT, and the corrosion resistance were rated B (poor). Comparative Example (B3) was rated x (not acceptable) because the Ti content was under the lower limit and thus the cracking resistance, the TS (AW), the tensile ductility after PWHT, and the corrosion resistance were rated B (poor).

Comparative Example (B4) was rated x (not acceptable) because the C content, the Ti content, ([Ti]+[Nb])/[C], and the S content were below the lower limits and thus the cracking resistance, the TS (AW), the tensile ductility after PWHT, and the corrosion resistance were rated B (poor). Comparative Example (B5) was rated x (not acceptable) because ([Ti]+[Nb])/[C] was under the lower limit and thus the corrosion resistance was rate B (poor). Comparative Example (B6) was rated x (not acceptable) because the Ti content and ([Ti]+[Nb])/[C] were below the lower limits and thus the cracking resistance, the TS (AW), and the corrosion resistance were rated B (poor). Comparative Example (B7) was rated x (not acceptable) because the Ti content and ([Ti]+[Nb])/[C] were below the lower limits and thus the TS (AW) and the corrosion resistance were rated B (poor).

Comparative Example (BR) was rated x (not acceptable) because ([Ti]+[Nb])/[C] was over the upper limit and thus the cracking resistance and the tensile ductility after PWHT were rated B (poor). Comparative Example (B9) was rated x (not acceptable) because ([Ti]+[Nb])/[C] was under the lower limit and thus the corrosion resistance was rated B (poor). Comparative Example (B10) was rated x (not acceptable) because the (Mo+W) content was over the upper limit and thus the cracking resistance and the tensile ductility after PWHT were rated B (poor).

The welding workability of Comparative Examples (B1 to B10) was rated A (excellent) or B (good).

The present application claims priority from Japanese Patent Application No. 2016-031425 filed Feb. 22, 2016, the entire contents of which are hereby incorporated by reference.

REFERENCE SIGNS LIST

1, 3 Base metal
2, 4 Weld metal
5 Backing material

The invention claimed is:

1. A Ni-based alloy solid wire for welding, comprising a composition comprising:
    Cr: 27.0 to 31.5 mass %,
    Ti: 0.97 to 2.40 mass %,
    Nb: 0.30 to 2.40 mass %,
    C: 0.020 to 0.040 mass %,
    S: 0.0005 to 0.0030 mass %,
    Mn: 0.20 to 1.00 mass %, and
    Fe: 5.0 to 11.0 mass %,
and further comprising:
    Mo+W: 0.5 mass % or less,
    P: 0.0100 mass % or less,
    Si: 0.50 mass % or less,
    Al: 0.20 mass % or less,
    Ca: 0.005 mass % or less,
    B: 0.005 mass % or less,
    Mg: 0.008 mass % or less,
    Zr: 0.005 mass % or less,
    Co: 0.10 mass % or less,
    O: 0.015 mass % or less,
    H: 0.003 mass % or less,
    N: from 0.015 mass % to greater than 0 mass %, and
    Ni and inevitable impurities,
    wherein ([Ti]+[Nb])/[C] is from 80 to 150, wherein [Ti], [Nb], and [C] represent the amounts (mass %) of Ti, Nb, and C, respectively.

2. A Ni-based alloy weld metal produced from by using the Ni-based alloy solid wire for welding according to claim 1.

3. The Ni-based alloy solid wire of claim 1, wherein the content of Mg is 0.007 mass % or less.

4. The Ni-based alloy solid wire of claim 1, wherein the contents of N is from 0.015 mass % to 0.001 mass %.

\* \* \* \* \*